Nov. 21, 1944.                B. M. BUTLER                 2,363,117
            ELECTRICALLY RESPONSIVE PRESSURE RELEASE MEANS
                    Filed Jan. 9, 1942           2 Sheets-Sheet 1
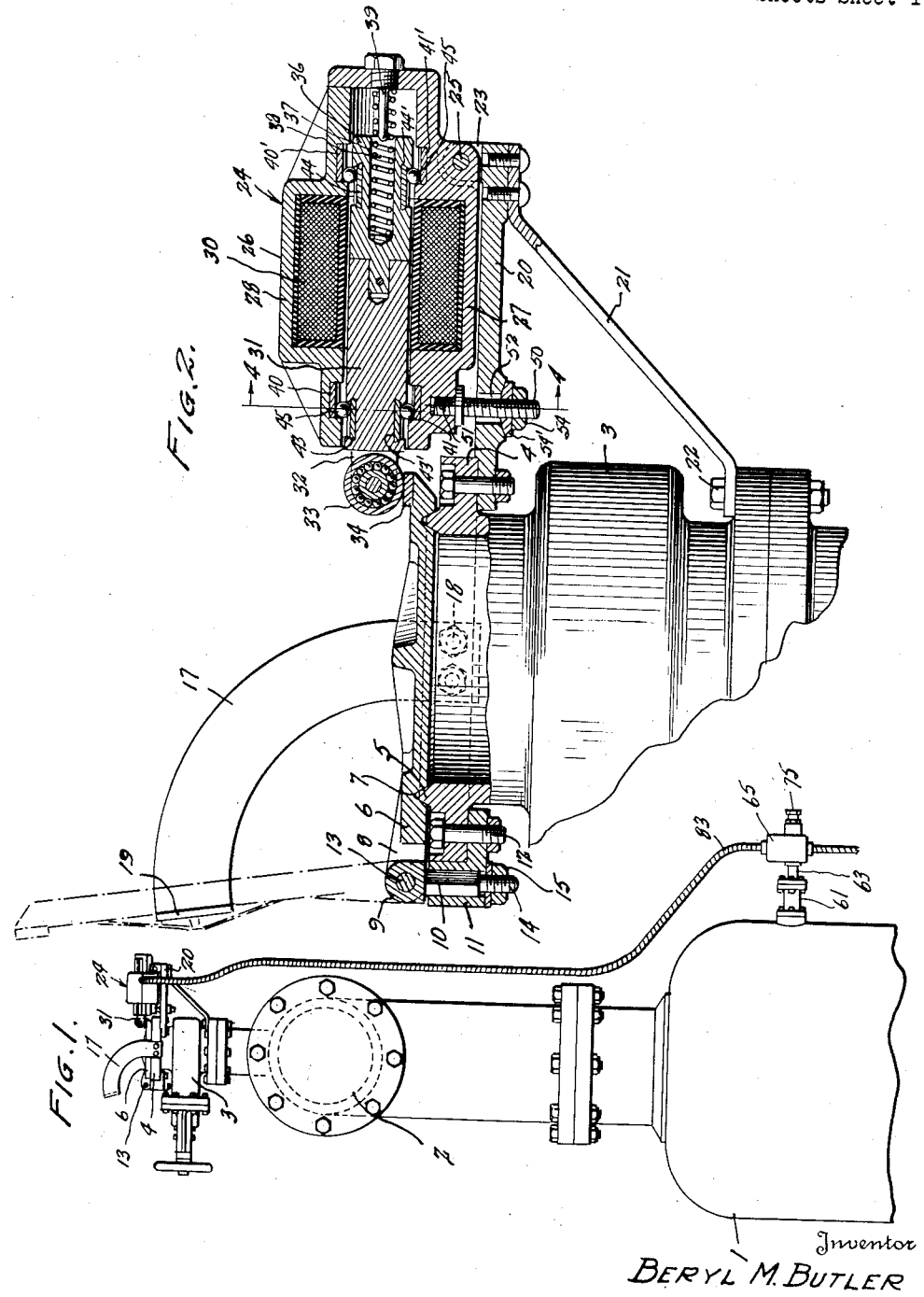
Inventor
BERYL M. BUTLER
By Semmes, Keegin, Beale & Semmes
Attorneys Nov. 21, 1944.  B. M. BUTLER  2,363,117
ELECTRICALLY RESPONSIVE PRESSURE RELEASE MEANS
Filed Jan. 9, 1942  2 Sheets-Sheet 2
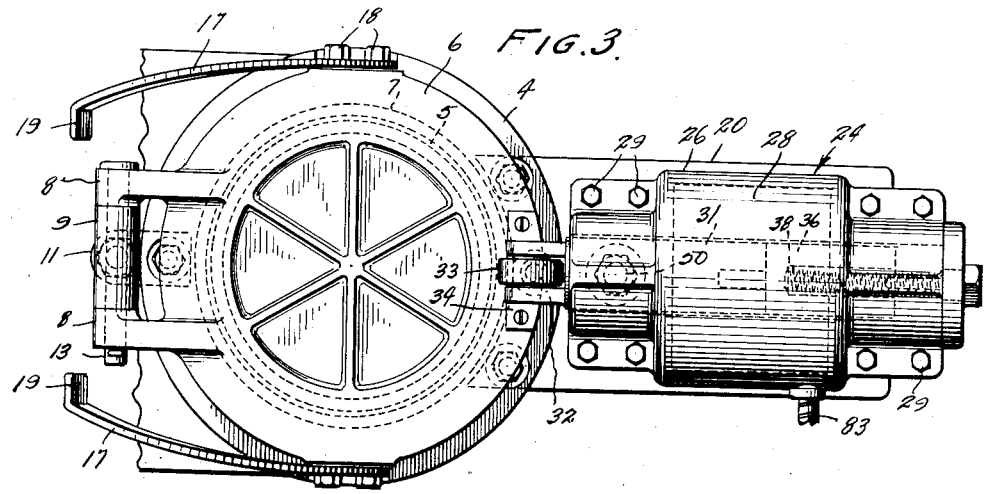
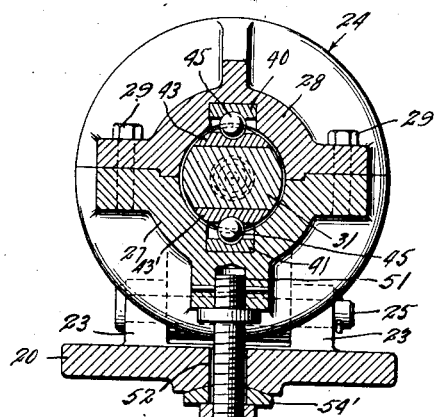
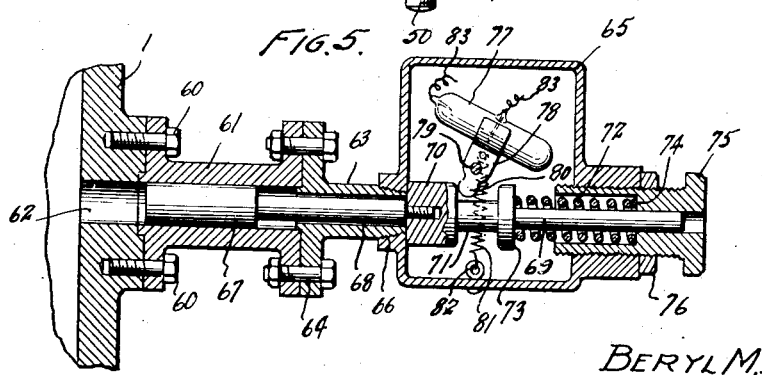
Inventor
BERYL M. BUTLER
By Semmes, Keegin, Beale & Semmes
Attorneys Patented Nov. 21, 1944

2,363,117

UNITED STATES PATENT OFFICE 2,363,117

ELECTRICALLY RESPONSIVE PRESSURE RELEASE MEANS

Beryl M. Butler, Texas City, Tex., assignor to Pan American Refining Corporation, Texas City, Tex., a corporation of Delaware Application January 9, 1942, Serial No. 426,261

2 Claims. (Cl. 137—139)

Generically, the present invention relates to pressure relieving means and specifically to an electrically operated means for relieving pressures in vessels that are subject to internal explosions. More particularly, means are responsive upon the occurrence of an explosion to actuate an electrically controlled device to enable a valve closure to open thereby permitting the gases generated by the explosion to escape. I have found that my present invention is especially efficacious in connection with inert gas generators although it can be employed with equally good results with other types of vessels.

I am, of course, well aware that the problem of venting these gases has been appreciated in the art and that certain attempts have been made to provide some means for permitting the escape of these gases. The desired results have generally been accomplished by the use of either spring loaded or weight loaded relief valves or by the use of a thin disc which will rupture at a predetermined pressure to permit the escape of the generated gases.

None of these prior practices has been entirely successful. For example, when using either spring loaded or weight loaded relief valves, it has been necessary to design structures which will resist the high pressure loads which means, of course, that the weight of the moving parts is so great that excessive forces are required to accelerate the operation of the valve during the opening cycle. While it is true that the rupture disc will overcome the disadvantages inherent in the employment of the spring or weight loaded relief valves, it is not entirely satisfactory since it has been difficult to predict the bursting point of the disc with any reasonable degree of accuracy. Another distinct disadvantage is that the disc is not self-closing and as a result the vessel must be either removed from service or provided with a supplementary valve to enable the disc to be replaced during operation.

An object of the present invention is to provide a pressure relieving valve which is operated by a solenoid which is energized through a control switch directly responsive to changes in pressure within the vessel.

Another object of the present invention is to provide a valve closure for vessels subject to internal explosions which will be opened when the impact from the explosion reaches it.

Yet a further object is to provide a novel electrically operated solenoid for permitting a valve closure to be opened.

To achieve the above and other advantageous objects, the present invention embraces the idea of providing a hinged valve closure on a vessel subject to internal explosions which is normally maintained in the closed position by virtue of a locking member operatively connected to a solenoid. The solenoid is energized and de-energized by means of a switch mounted on the vessel or in any other suitable location which is adapted to close when an explosion occurs within the vessel. The energization of the solenoid withdraws the locking member from the closure thereby enabling the closure to be opened readily when the gases generated reach it and further means are provided to co-act with the closure to dampen its opening movement and to maintain the closure in the fully opened position.

The switch mounted on the vessel can be adjusted to close when the pressure within the vessel attains any predetermined pressure. In addition, the solenoid is adjustably mounted with respect to the closure so that the pressure which is required to vary the tightness of the cover joint can be regulated.

In the drawings:

Figure 1 is a side elevational view of a closed vessel equipped with my novel pressure relieving device.

Figure 2 is a fragmental side elevational view partly in section showing the structure of the valve closure and the solenoid.

Figure 3 is a top plan view of the valve closure and the solenoid.

Figure 4 is a sectional view taken along the line 4—4 of Figure 2 looking in the direction of the arrows.

Figure 5 is a longitudinal sectional view of the switch for closing the circuit to the solenoid.

Referring to Figure 2, there is shown a closed vessel 1 which has suitably secured thereto a header 2. Attached to the upper end of the header 2 is a valve 3 of conventional construction which is provided with an annular flange 4 adjacent to its upper open end provided with a circumferential seat 5. A closure 6 for the open end of the valve 3 is formed with an annular groove 7 that is adapted to receive the seat 5. The closure is formed with a pair of laterally extending arms 8 and positioned between the arms is an eye 9 formed on a squared shank pin 10. The shank of the pin fits within a squared aperture formed in a fitting 11 that is attached to the flange 4 as shown at 12. A pivot pin 13 extends through aligned apertures in the arms 8 and eye 9 whereby the closure 6 is mounted for pivotal movement on the valve 3.

It will be observed that the lower end of the squared shank 10 is formed with a reduced screw threaded portion 14 having a nut 15 threaded thereon. As will later become more fully appreciated, by proper manipulation of the nut 15 it is possible to vary the relative position of the closure 6 with respect to the open end of the valve.

Converging arcuate spring arms 17 are attached to the valve casing 3 as shown at 18 and each arm is provided at its free end with a stop 19. The arms 17 will function to dampen the opening movement of the closure 6 and the stops 19 will maintain the closure in the open position as illustrated by the dot dash lines in Figure 2.

As previously pointed out, the closure 6 is maintained in its closed or seated position on the seat 5 by virtue of a locking device that is electrically operated. The structure for achieving this purpose is clearly shown in Figure 2 and it can be seen that a support plate 20 is attached to the under face of the flange 4 and is supported at its outer end by a strap 21 attached thereto and to the lower flange of the valve as shown at 22. The plate 21 has formed thereon a pair of lugs 23 and a solenoid illustrated generally 24 is pivoted thereto as shown at 25. The solenoid 24 comprises a split casing 26 and is formed with a lower member 27 and an upper member 28 that are bolted together as shown at 29. Mounted within the casing 26 is a conventional solenoid winding 30 having movable therein an armature 31. The armature 31 is provided at its outer end with a bifurcation 32 which carries an antifriction roller 33 that is adapted to contact a plate 34 secured to the upper surface of the closure 6. As long as the roller 33 rests on the plate 34 the closure 6 will remain in the closed position.

Attached to the inner end of the armature 31 is a non-magnetic extension 36 which is formed with an axial socket 37. A helical spring 38 one end of which is positioned in the socket 37 fits around a pin 39 which is suitably secured in the end of the solenoid casing 26. The spring 38 will hold normally the core 31 in the position shown in Figure 2, namely, it will maintain the roller 33 on the element 34 to keep the closure 6 in its seated position.

The upper and lower members 28 and 27 are provided with ball races 40, 41 and 40', 41' respectively, adjacent to their forward and rearward ends. Races 43 and 43' are provided on the armature 31 near its forward end and the extension 36 is provided also with races 44 and 44' and balls 45 are disposed between the races of the armature and extension and those in the casing. Clearly, the ball race structure just described will permit the core 31 and the fitting 36 to have longitudinal movement within the casing 24 with a minimum of friction. In addition, by virtue of the structure of the race, it can be seen that the amount of rotary movement of the armature is limited and the amount of longitudinal movement of the armature is governed positively by the race. The advantage of this novel structure will be readily appreciated in that it will insure free movement of the armature and the roller 33 regardless of the tension placed on the roller.

As previously adverted to hereinabove, an important feature of this invention is to provide means whereby the solenoid 24 is adjustably mounted with respect to the closure 6. In other words, it is possible to adjust the fit between the seat 5 and the groove 7 formed in the closure 6. In Figure 4, it will be observed that an adjusting bolt 50 is attached to the forward end of the casing 27 as shown at 51 and extends through an aperture 52 formed near the forward end of the plate 20. An adjusting nut 54 is threaded onto the lower end of the bolt 50 and a washer 54' having a spherical face is positioned between the nut and the aperture 52. By drawing up the nut it is possible to move the casing 24 downwardly about its pivot 25 to provide a tighter fit between the groove 7 and the seat 5. To assure uniform fitting the nut 15 associated with the pin 10 may be likewise drawn up to move the pivot point of the closure to the ring 13 downwardly the required distance.

When the armature 31 is in the position depicted in Figure 2, the winding 30 is de-energized and to energize the winding to draw the armature 31 inwardly, attention is called to the structure illustrated in Figure 5. Bolted to the vessel, as shown at 60, is a flanged cylinder 61 which communicates with the interior of the vessel through a port 62. A nipple 63 is secured to the outer flange of the cylinder as illustrated at 64 and a casing 65 is threaded onto the end of the nipple 63 as at 66. A piston 67 is adapted to slide in the sleeve 61 and is provided with a rod 68 which extends through the nipple 63.

Attached to the end of the piston rod 68 within the casing 65 is a switch actuating member 69 having an enlarged end 70 provided with an axial groove 71. A helical compression spring 72 surrounds the reduced portion of the member 69. One end of the spring 72 bears against shoulder 73 formed by the enlarged end 70 and its opposite end bears against the shoulder of a stepped bore 74 in adjusting screw 75. The screw 75 is in axial alignment with the cylinder 61 and also acts as a guide for the free end of the member 69. A lock-nut 76 is provided on the screw 75 to maintain the screw in its correctly adjusted position.

A mercury switch 77 of conventional design is carried by one end of a lever 78 pivoted on a pin 79 attached to the casing 65. The opposite end of the lever 78 is rounded as shown at 80 and is positioned in the groove 71. An off-center tension spring 81 is attached to the lever 78 above the pivotal pin 79 and the opposite end of the spring is secured to the bottom wall of the casing 65 as indicated at 82. Suitable electrical conductors 83 are provided between the switch 77 and the solenoid winding 30.

The compression of the spring 72 is adjusted by the screw 75 to maintain the piston 67 in its extended position, that is, toward the vessel 1 against ordinary operating pressures within the vessel. In this position the mercury switch 77 will be open and as a consequence no current will flow to the solenoid.

In operation, when an explosion occurs within the vessel 1, the increased pressure of the gases will force the piston 67 outwardly, thus overcoming the action of the spring 72. Simultaneously, the lever 78 will be moved about its pivot 79 tilting the switch 77 and closing its contacts. Immediately upon the closing of the mercury switch, the solenoid winding 30 is energized and the armature 31 is drawn inwardly which, of course, means that the roller 33 is moved away from the plate 34. Consequently, when the gases generated by the explosion contact the lower side of the closure 6, the closure is immediately moved upwardly about its pivot point 13 and the gases vented. The opening movement of the closure is, of course, dampened by the spring arms 17.

The stops 19 will, of course, limit the movement of the closure and maintain it in the opened position. After the gases have been vented, the valve 3 is actuated to close the outlet and the closure 6 is manually reseated. The solenoid is automatically re-set and if necessary a proper seat between the closure and the open end of the header may be accomplished. The valve 3 is then re-opened.

The advantages of the present invention are thought to be fully appreciated from the above description. The solenoid and the closure for the open end of the header are so formed that a minimum of friction is permitted between the closure and the holding armature while a maximum seal is provided between the closure and the open end of the header. Furthermore, it is possible to energize the solenoid whenever the pressure within the vessel exceeds a certain predetermined limit by proper adjustment of operating time for the mercury switch.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A detent mechanism for normally holding a closure against a large opening in a header extending a substantial distance from a vessel wherein an explosion may occur, said detent mechanism comprising a casing pivotally mounted on said header, a solenoid in said casing, a movable armature within said solenoid, means for providing substantially friction-free movement of the armature and means for limiting said movement in both directions, an extension at one end of said armature, a contact roller carried by said extension, means for providing substantially friction-free rotation of said contact roller and means for holding said contact roller under tension against the periphery of said closure whereby said closure may be normally held against the opening in the header by said detent but said detent may be substantially instantaneously retracted from said periphery by movement of the armature through said solenoid when the solenoid is actuated.

2. A detent and operating mechanism therefor comprising a solenoid, a casing for said solenoid, a pivoted support for said casing, a movable armature within said solenoid, a non-magnetic extension fixed to one end of said armature, longitudinally disposed anti-friction means for said armature providing substantially friction-free movement of the armature longitudinally, stop means to limit the extent of the longitudinal displacement of the armature, spring means associated with said extension and adapted to urge the armature longitudinally, an extension on the other end of said armature, an anti-friction contact roller carried by said extension and bolt means for adjustably fixing said casing about said pivot whereby the normal lateral thrust by said contact roller is controlled.

BERYL M. BUTLER.